United States Patent [19]
Lim

[11] Patent Number: 5,959,850
[45] Date of Patent: Sep. 28, 1999

[54] ASYMMETRICAL DUTY CYCLE FLYBACK CONVERTER

[75] Inventor: Sung Ho Lim, Seoul, Rep. of Korea

[73] Assignee: Samsung Electro-Mechanics Co., Ltd., Suwon, Rep. of Korea

[21] Appl. No.: 09/192,681

[22] Filed: Nov. 16, 1998

[30] Foreign Application Priority Data

Nov. 18, 1997 [KR] Rep. of Korea ...................... 97-60730

[51] Int. Cl.[6] .................................................. H02M 3/335
[52] U.S. Cl. ............................................. 363/17; 363/132
[58] Field of Search .................................. 363/17, 24, 25, 363/56, 95, 97, 98, 124, 131, 132, 134

[56] References Cited

U.S. PATENT DOCUMENTS

| | | | |
|---|---|---|---|
| 5,159,541 | 10/1992 | Jain | 363/26 |
| 5,245,520 | 9/1993 | Imbertson | 363/17 |
| 5,719,754 | 2/1998 | Fraidlin et al. | 363/17 |
| 5,754,413 | 5/1998 | Fraidlin et al. | 363/16 |
| 5,808,879 | 9/1998 | Liu et al. | 363/17 |
| 5,822,198 | 10/1998 | Fraidlin et al. | 363/17 |
| 5,838,552 | 11/1998 | Fraidlin et al. | 363/16 |
| 5,870,291 | 2/1999 | Farrington et al. | 363/17 |

*Primary Examiner*—Adolf Deneke Berhane
*Attorney, Agent, or Firm*—Ladas & Parry

[57] ABSTRACT

An asymmetrical duty cycle flyback converter comprising a main transformer for transforming an input voltage at a desired ratio, the main transformer including a primary winding connected to an input stage and a secondary winding connected to an output stage, a switching circuit for switching the input voltage to the main transformer, the switching circuit including first and second switches, a rectifying/smoothing circuit for rectifying and smoothing an output voltage from the main transformer, a controller for generating a control signal in response to an output voltage from the rectifying/smoothing circuit to control the switching operation of the switching circuit, and a switch driver for generating first and second drive signals in response to the control signal from the controller to drive the first and second switches in the switching circuit in such a manner that they can complementarily be switched on the basis of on-time duties asymmetrical with respect to each other and at an interval of a dead time therebetween to perform a zero voltage switching operation. With this construction, the present invention has the effect of realizing a miniaturation and improvement in power efficiency.

10 Claims, 4 Drawing Sheets

ASYMMETRICAL DUTY CYCLE FLYBACK CONVERTER

BACKGROUND OF THE INVENTION

1. Field of the Invention

The present invention relates in general to a power supply, and more particularly to an asymmetrical duty cycle flyback converter for miniaturization and in power efficiency.

2. Description of the Prior Art

Generally, a power supply comprises a transformer connected between an input stage and an output stage, and a switch connected between the input stage and the transformer. The switch is on/off-controlled by a pulse signal supplied from a pulse width modulation integrated circuit (PWM IC). If the switch is turned on, current flows therethrough. When the switch is turned off, a voltage is applied across it while current flowing thereto is blocked. As a result, the current and voltage are overlapped, resulting in a loss in power.

A technique is known which designs the switch in such a manner that the current and voltage are not overlapped and controls the on/off operations of the switch, so as to improve a power efficiency. Such a technique is so-called "zero voltage switching (ZVS)".

FIG. 1 is a circuit diagram of a conventional half-bridge converter for the ZVS. As shown in this drawing, the half-bridge converter comprises a transformer T for transforming an input voltage Vi at a desired ratio, a switching circuit 10 for switching the input voltage Vi to the transformer T, and a rectifying/smoothing circuit 12 for rectifying and smoothing an output voltage from the transformer T. To this end, the rectifying/smoothing circuit 12 includes a first diode D1, second diode D2, coil L and a second capacitor Co.

The half-bridge converter further includes a controller 14 for controlling the switching operation of the switching circuit 10, and a driver 16 for driving the switching circuit 10 in response to an output signal from the controller 14.

The transformer T includes a first winding N1 at its primary side and second and third windings N2 and N3 at its secondary side, which are connected in series to each other.

The switching circuit 10 is provided with a first field effect transistor Q1 and a second field effect transistor Q2 connected in series between an input stage and a ground voltage source. The first winding N1 of the transformer T has its one side connected to a node between the first and second field effect transistors Q1 and Q2. A first capacitor Cs is connected in series to the first winding N1 of the transformer T.

The transformer T is provided with a half bridge at its secondary side, and, in the rectifying/smoothing circuit 12, the first diode D1 has its anode connected to the second winding N2 of the transformer T, the second diode D2 has its anode connected to the third winding N3 of the transformer T, the coil L has its one side connected to a node between the first and second diodes D1 and D2, and the second capacitor Co connected between the other side of the coil L and a node between the second and third windings N2 and N3 of the transformer T.

The controller 14 is preferably provided with a PWM IC. The driver 16 drives the first and second field effect transistors Q1 and Q2 in an asymmetrical and complementary manner in response to the output signal from the controller 14. To this end, the driver 16 is provided with an inverter 16a and a buffer 16b.

In the conventional half-bridge converter as shown in FIG. 1, the ZVS is realized by switching the first and second field effect transistors Q1 and Q2 in the asymmetrical and complementary manner. However, the above-mentioned conventional half-bridge converter has a disadvantage in that the transformer T is large in size because it is provided with the half bridge at its secondary side. Further, an output voltage from an auxiliary power supply (not shown), which supplies power to the controller 14 comprising the PWM IC, is varied with a variation in the input voltage Vi, resulting in heating of the controller 14 and the subsequent faulty operation thereof. The conventional half-bridge converter is further disadvantageous in that a switching noise occurs when the first and second diodes D1 and D2 are switched on/off.

SUMMARY OF THE INVENTION

Therefore, the present invention has been made in view of the above problems, and it is an object of the present invention to provide an asymmetrical duty cycle flyback converter in which a switching circuit is provided to perform a ZVS operation and a rectifying diode has a minimized switching noise, so that a controller can be prevented from being heated and a transformer can have a miniaturized size.

In accordance with the present invention, the above and other objects can be accomplished by an asymmetrical duty cycle flyback converter comprising a main transformer for transforming an input voltage at a desired ratio. The main transformer includes a primary winding connected to an input stage and a secondary winding connected to an output stage. A switching device switches the input voltage to the main transformer, the switching device including first and second switches; rectifying/smoothing means for rectifying and smoothing an output voltage from the main transformer; control means for generating a control signal in response to an output voltage from the rectifying/smoothing means to control the switching operation of the switching means; and switch driving means for generating first and second drive signals in response to the control signal from the control means to drive the first and second switches in the switching device in such a manner that the switches can complementarily be switched on the basis of on-time duties asymmetrical with respect to each other and at an interval of a dead time therebetween to perform a zero voltage switching operation.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
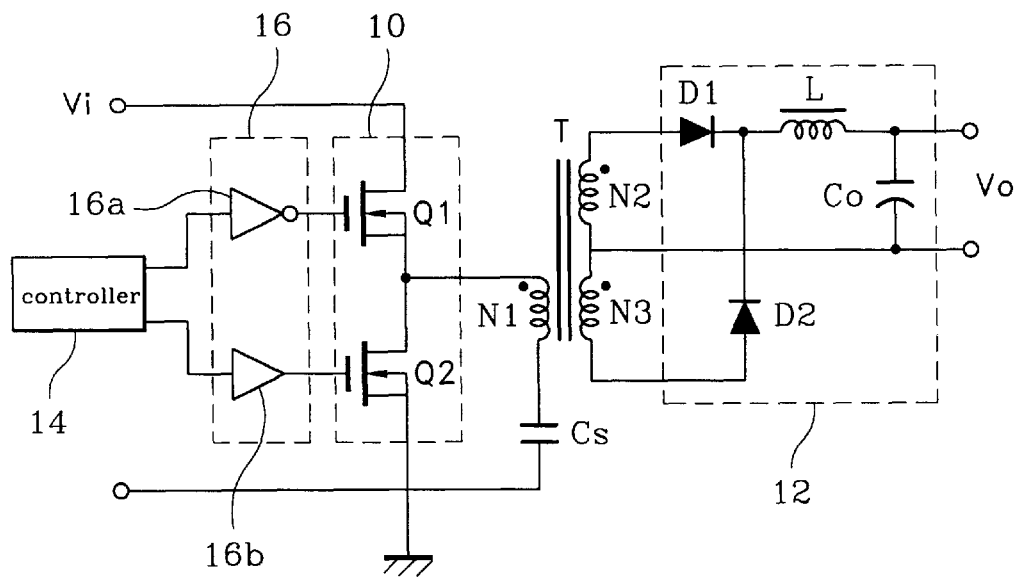
FIG. 1 is a circuit diagram of a conventional half-bridge converter.
Figure 2:
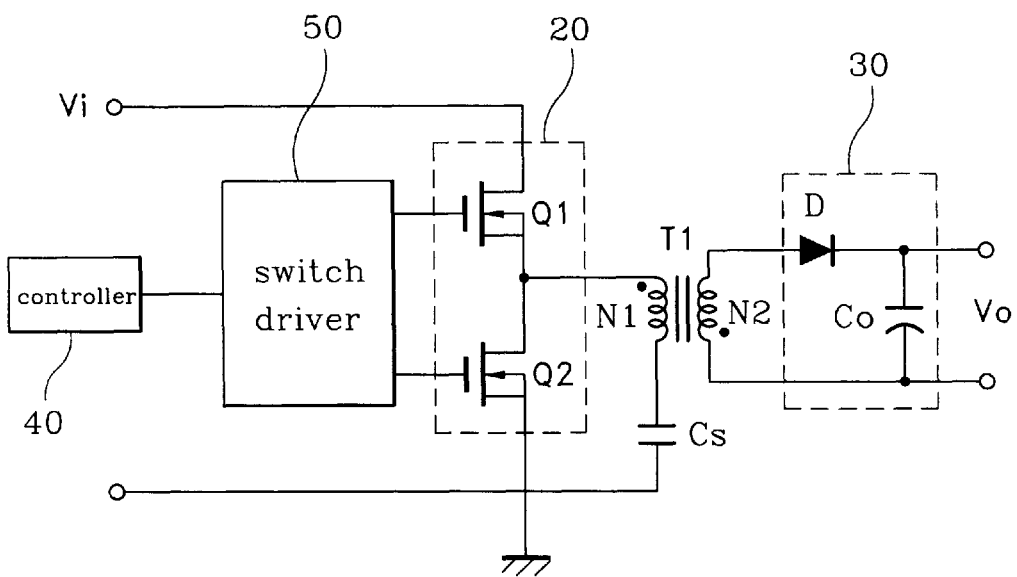
FIG. 2 is a circuit diagram of an asymmetrical duty cycle flyback converter in accordance with the present invention.

With reference to FIG. 2, there is shown a circuit diagram of an asymmetrical duty cycle flyback converter in accordance with the present invention. As shown in this drawing, the asymmetrical duty cycle flyback converter comprises a main transformer T1 for transforming an input voltage Vi at a desired ratio. To this end, the main transformer T1 includes a primary winding N1 connected to an input stage and a secondary winding N2 connected to an output stage. A switching circuit 20 is provided to switch the input voltage Vi to the main transformer T1. To this end, the switching circuit 20 includes first and second switches. A rectifying/smoothing circuit 30 is provided to rectify and smooth an output voltage from the main transformer T1. A controller 40 is adapted to generate a control signal in response to an output voltage from the rectifying/smoothing circuit 30 to control the switching operation of the switching circuit 20. A switch driver 50 is adapted to generate first and second drive signals in response to the control signal from the controller 40 to drive the first and second switches in the switching circuit 20 in such a manner that they can complementarily be switched on the basis of on-time duties asymmetrical with respect to each other and at an interval of a dead time therebetween to perform a ZVS operation.

The first and second switches in the switching circuit 20 are provided respectively with first and second field effect transistors Q1 and Q2 connected in series between the input stage and a ground voltage source. The primary winding N1 of the main transformer T1 has its one side connected to a node between the first and second field effect transistors Q1 and Q2 and its other side connected in series to a first capacitor Cs.

The rectifying/smoothing circuit 30 includes a diode D having its anode connected to one side of the secondary winding N2 of the main transformer T1, and a second capacitor Co connected between the other side of the secondary winding N2 of the main transformer T1 and a cathode of the diode D. The controller 40 is preferably provided with a PWM IC.

Figure 3:
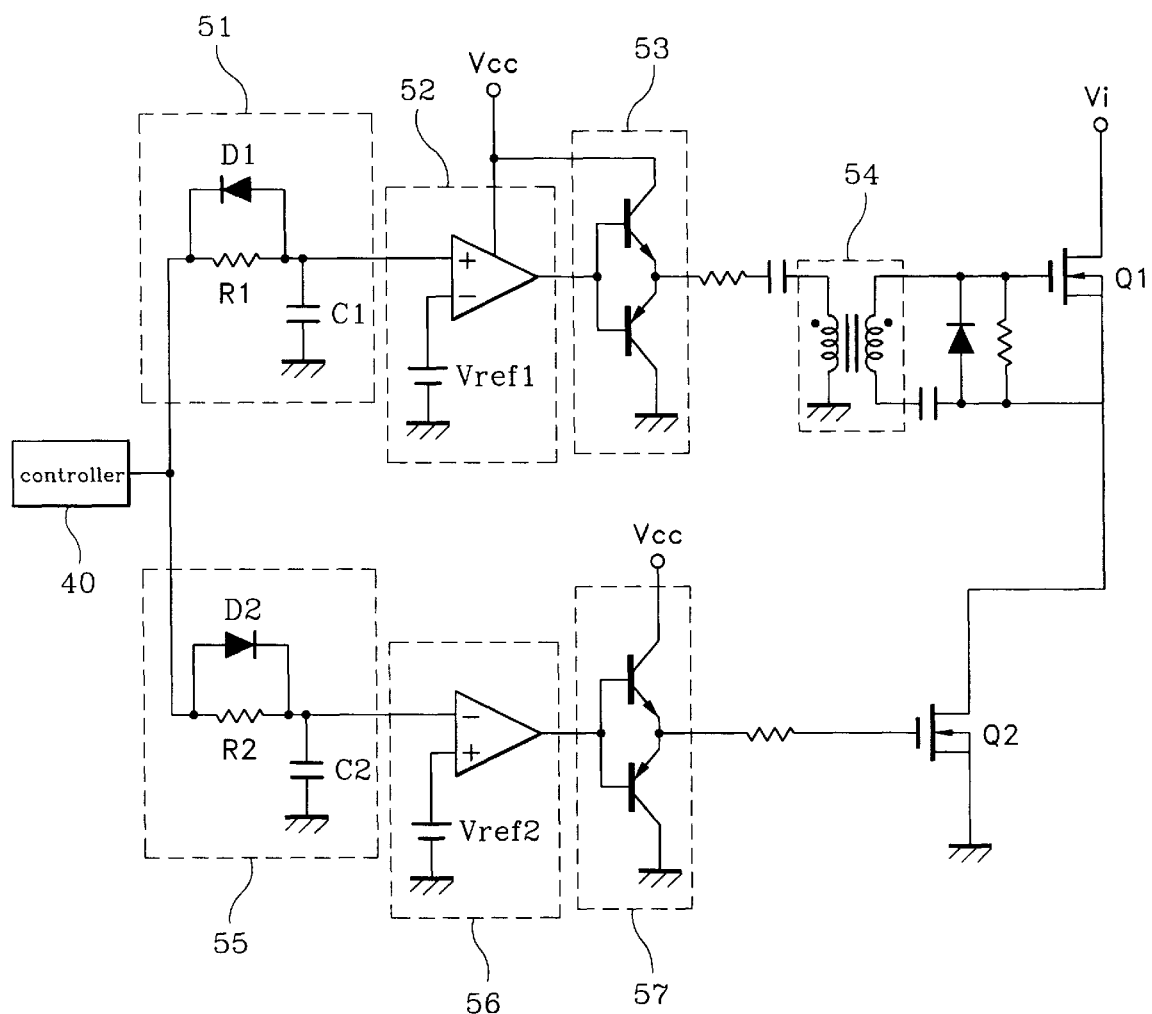
FIG. 3 is a detailed circuit diagram of a switch driver in FIG. 2.
Figure 4:
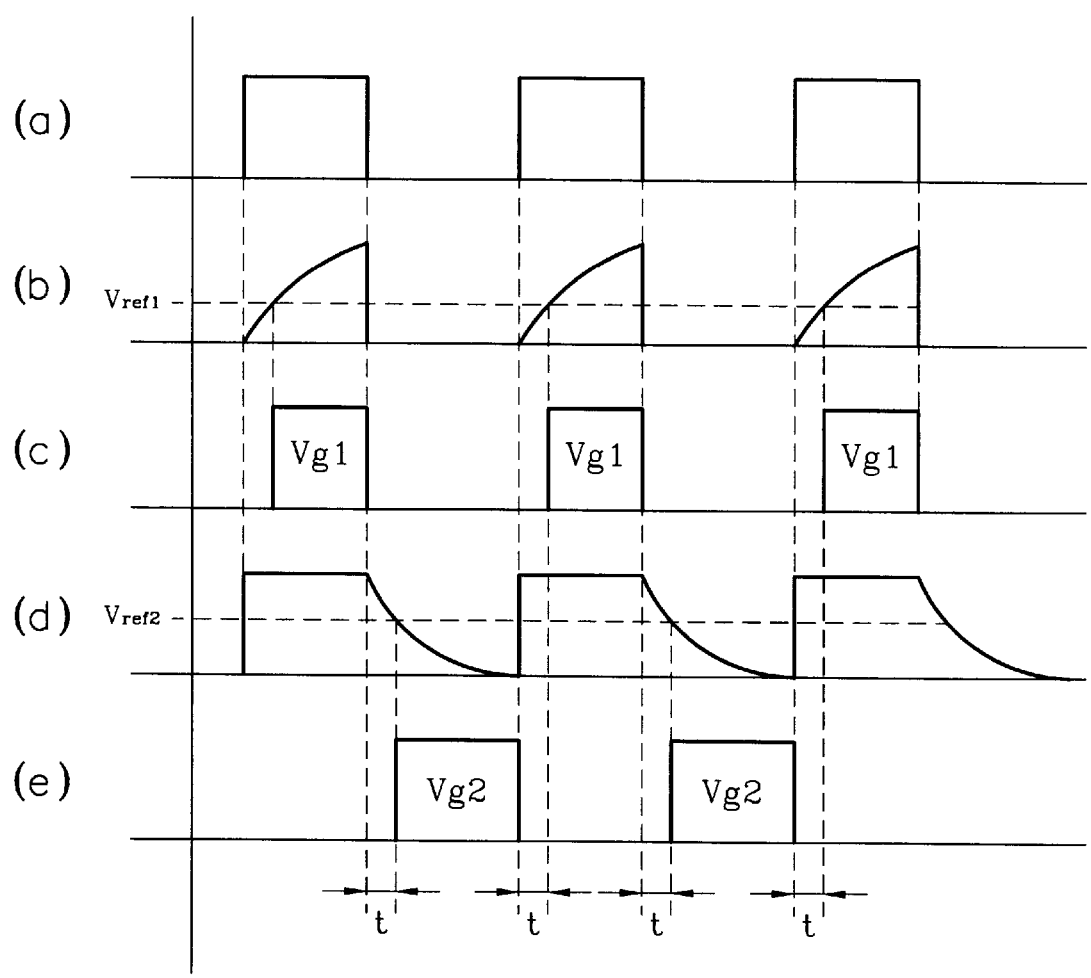
FIG. 4a is a waveform diagram of an output signal from a controller in FIG. 2.
FIG. 4b is a waveform diagram of an output signal from a first delay circuit in FIG. 3.
FIG. 4c is a waveform diagram of an output signal from a first comparison circuit in FIG. 3, which is used to drive a first field effect transistor in a switching circuit in FIG. 2.
FIG. 4d is a waveform diagram of an output signal from a second delay circuit in FIG. 3.
FIG. 4e is a waveform diagram of an output signal from a second comparison circuit in FIG. 3, which is used to drive a second field effect transistor in the switching circuit in FIG. 2.
Figure 5:
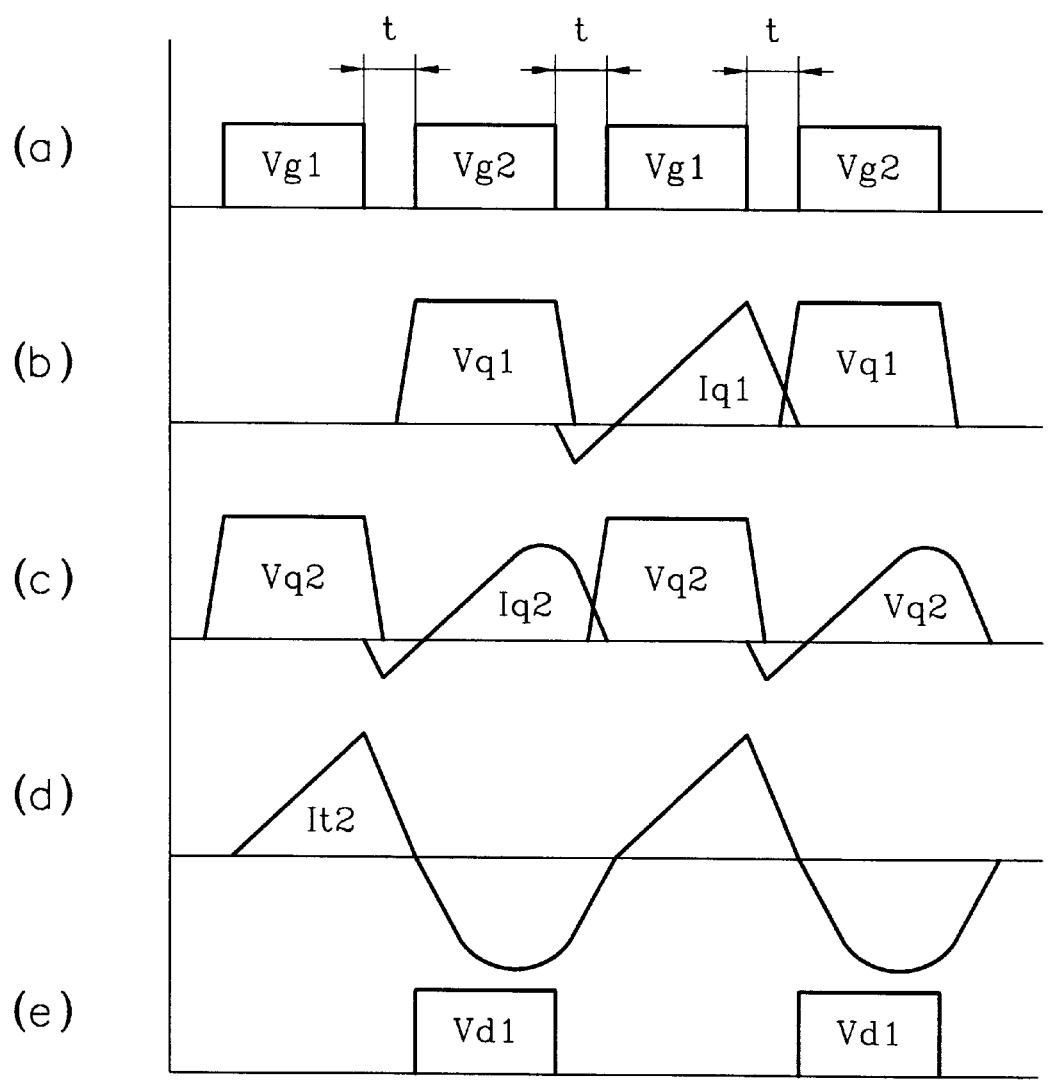
FIG. 5a is a waveform diagram of first and second drive signals used to drive the first and second field effect transistors in the switching circuit in FIG. 2.
FIG. 5b is a waveform diagram illustrating a voltage-current relation of the first field effect transistor in the switching circuit in FIG. 2.
FIG. 5c is a waveform diagram illustrating a voltage-current relation of the second field effect transistor in the switching circuit in FIG. 2.
FIG. 5d is a waveform diagram of current flowing through a main transformer in FIG. 2.
FIG. 5e is a waveform diagram of a voltage across a diode in a rectifying/smoothing circuit in FIG. 2.

FIG. 3 is a detailed circuit diagram of the switch driver 50 in FIG. 2. As shown in this drawing, the switch driver 50 includes a first delay circuit 51 for delaying the control signal from the controller 40 for a first predetermined time period, a first comparison circuit 52 for comparing the level of an output signal from the first delay circuit 51 with that of a first reference voltage signal Vref1 and providing its output signal only when the output signal from the first delay circuit 51 is higher in level than the first reference voltage signal Vref1, and a first buffer 53 for buffering the output signal from the first comparison circuit 52 and applying the buffered signal to a gate of the first field effect transistor Q1 in the switching circuit 20. An electric isolator 54 is provided to electrically isolate the first field effect transistor Q1 from an output signal from the first buffer 53. A second delay circuit 55 is provided to delay the control signal from the controller 40 for a second predetermined time period. A second comparison circuit 56 is adapted to compare the level of an output signal from the second delay circuit 55 with that of a second reference voltage signal Vref2 and provide its output signal only when the output signal from the second delay circuit 55 is lower in level than the second reference voltage signal Vref2. A second buffer 57 is adapted to buffer the output signal from the second comparison circuit 56 and apply the buffered signal to a gate of the second field effect transistor Q2 in the switching circuit 20.

The first delay circuit 51 includes a first resistor R1 having its one side connected to an output terminal of the controller 40, a reverse, first diode D1 connected in parallel to the first resistor R1, and a capacitor C1 having its one side connected to a node between the other side of the first resistor R1 and the first diode D1 and its other side connected to the ground voltage source.

The first comparison circuit 52 is provided with a comparator having its non-inverting input terminal (+) connected to an output terminal of the first delay circuit 51 and its inverting input terminal (−) connected to a first reference voltage source for generating the first reference voltage Vref1. The first reference voltage source is connected between the inverting input terminal (−) of the comparator and the ground voltage source.

The first buffer 53 includes npn and pnp transistors connected in series between a supply voltage source Vcc and the ground voltage source. These npn and pnp transistors have their bases connected in common to an output terminal of the first comparison circuit 52.

The electric isolator 54 includes a transformer with primary and secondary windings. The primary winding of the transformer has its one side connected to an output terminal of the first buffer 53 through a resistor and a capacitor and its other side connected to the ground voltage source. The secondary winding of the transformer is connected between the gate and a source of the first field effect transistor Q1 in the switching circuit 20.

The second delay circuit 55 includes a second resistor R2 having its one side connected to the output terminal of the controller 40, a forward, second diode D2 connected in parallel to the second resistor R2, and a capacitor C2 having its one side connected to a node between the other side of the second resistor R2 and the second diode D2 and its other side connected to the ground voltage source.

The second comparison circuit 56 is provided with a comparator having its inverting input terminal (−) connected to an output terminal of the second delay circuit 55 and its non-inverting input terminal (+) connected to a second reference voltage source for generating the second reference voltage Vref2. The second reference voltage source is connected between the non-inverting input terminal (+) of the comparator and the ground voltage source.

The second buffer 57 includes npn and pnp transistors connected in series between the supply voltage source Vcc and the ground voltage source. These npn and pnp transistors have their bases connected in common to an output terminal of the second comparison circuit 56 and their emitters connected in common to the gate of the second field effect transistor Q2 in the switching circuit 20.

The operation of the asymmetrical duty cycle flyback converter with the above-mentioned construction in accordance with the present invention will hereinafter be described in detail with reference to FIGS. 4a to 5e.

First, the controller 40 generates a square wave pulse signal as shown in FIG. 4a in response to an output voltage Vo from the rectifying/smoothing circuit 30, fed back by a feedback circuit (not shown). The controller 40 outputs the generated square wave pulse signal to the first and second delay circuits 51 and 55. The first delay circuit 51 generates a saw tooth wave signal with a rising curve as shown in FIG. 4b in response to the output signal from the controller 40. The second delay circuit 55 generates a signal with a falling curve after a predetermined square wave duration as shown in FIG. 4d in response to the output signal from the controller 40. The first delay circuit 51 outputs the generated saw tooth wave signal to the first comparison circuit 52, the rising curve of which is determined according to an RC time constant of the first resistor R1 and capacitor C1. The second delay circuit 55 outputs the generated signal to the second comparison circuit 56, the falling curve of which is determined according to an RC time constant of the second resistor R2 and capacitor C2. The comparator in the first comparison circuit 52 inputs the output signal from the first delay circuit 51 at its non-inverting input terminal (+) and the first reference voltage signal Vref1 from the first reference voltage source at its inverting input terminal (−) and compares the levels of the inputted signals with each other. Then, the comparator in the first comparison circuit 52 outputs a square wave pulse signal as shown in FIG. 4c only when the output signal from the first delay circuit 51 is higher in level than the first reference voltage signal Vref1. The output signal from the comparator in the first comparison circuit 52 is applied to the gate of the first field effect transistor Q1 in the switching circuit 20 through the first buffer 53 and electric isolator 54 to drive the first field effect transistor Q1. On the other hand, the comparator in the second comparison circuit 56 inputs the output signal from the second delay circuit 55 at its inverting input terminal (−) and the second reference voltage signal Vref2 from the second reference voltage source at its non-inverting input terminal (+) and compares the levels of the inputted signals with each other. Then, the comparator in the second comparison circuit 56 outputs a square wave pulse signal as shown in FIG. 4e only when the output signal from the second delay circuit 55 is lower in level than the second reference voltage signal Vref2. The output signal from the comparator in the second comparison circuit 56 is applied to the gate of the second field effect transistor Q2 in the switching circuit 20 through the second buffer 57 to drive the second field effect transistor Q2.

As mentioned above, on the basis of the output signal from the controller 40, the switch driver 50 generates the first and second drive signals Vg1 and Vg2 as shown respectively in FIGS. 4c and 4e, namely, integrally in FIG. 5a, which have on-time duties asymmetrical with respect to each other and a dead time t therebetween so that they can complementarily be made active to drive the first and second field effect transistors Q1 and Q2 in the switching circuit 20. As a result, the first and second field effect transistors Q1 and Q2 are complementarily switched on the basis of the on-time duties asymmetrical with respect to each other and at an interval of the dead time t therebetween to perform the ZVS operation as shown in FIGS. 5b and 5c.

In response to the first and second drive signals Vg1 and Vg2 as shown in FIG. 5a, if the first field effect transistor Q1 is turned on, the second field effect transistor Q2 is turned off. At this time, current flows to the first capacitor Cs through the primary winding N1 of the main transformer T1, thereby causing a voltage to be charged on the first capacitor Cs.

Thereafter, in response to the first and second drive signals Vg1 and Vg2 as shown in FIG. 5a, if the first field effect transistor Q1 is turned off, the voltage charged on the first capacitor Cs is applied through the primary winding N1 of the main transformer T1 to a drain of the second field effect transistor Q2, which is then turned on after the lapse of the dead time t. As a result, a current loop is formed sequentially through the first capacitor Cs, primary winding N1 of the main transformer T1 and second field effect transistor Q2. At this time, the first capacitor Cs and primary winding N1 of the main transformer T1 resonate on the basis of their capacitance and inductance. Energy resulting from this resonance is induced to the secondary winding N2 of the main transformer T1, thereby making the diode D conductive. As a result, a current loop is formed sequentially through the secondary winding N2 of the main transformer T1, diode D and second capacitor Co.

The first and second field effect transistors Q1 and Q2 are complementarily switched at an interval of the dead time t therebetween, as mentioned above. For this reason, as shown in FIGS. 5b and 5c, currents Iq1 and Iq2 flowing respectively through the first and second field effect transistors Q1 and Q2 have convex components below respective reference voltages when the resonance is performed. Thus, the currents Iq1 and Iq2 are not overlapped respectively with voltages Vq1 and Vq2, resulting in the realization of zero crossing. Further, both plus (+) and minus (−) components of current flow through the main transformer T1, as shown in FIG. 5d. As a result, both one and three-upper limits of a B-H curve can be used in the main transformer T1 because of characteristics of a magnetic flux B and magnetic field H. This has the effect of reducing the size of the main transformer T1 to about half of that used in the prior art.

As apparent from the above description, according to the present invention, the asymmetrical duty cycle flyback converter comprises the switching circuit with the first and second switches which are complementarily switched on the basis of the switching duties asymmetrical with respect to each other and at an interval of the sufficient dead time therebetween to perform the ZVS operation. This has the effect of improving a power efficiency. Further, the electric isolator is provided to electrically isolate the first switch in the switching circuit from an external signal to stabilize the operation of the first switch. The main transformer is designed in such a manner that both of the one and three-upper limits of the B-H curve can be used therein. This has the effect of minimizing the size of the main transformer. Moreover, the main transformer is not provided with a half-bridge at its secondary side. Therefore, the rectifying diode has a minimized switching noise, so that the controller can be prevented from being heated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An asymmetrical duty cycle flyback converter comprising:

a main transformer for transforming an input voltage at a desired ratio, said main transformer including a primary winding connected to an input stare and a secondary winding connected to an output stage;

switching means for switching said input voltage to said main transformer, said switching means including first and second switches;

rectifying/smoothing means for rectifying and smoothing an output voltage from said main transformer;

control means for generating a control signal in response to an output voltage from said rectifying/smoothing means to control the switching operation of said switching means; and switch driving means for generating first and second drive signals in response to said control signal from said control means to drive said first and second switches in said switching means in such a manner that they can be switched complementarily on the basis of on-time duties asymmetrical with respect to each other and at an interval of a dead time therebetween to perform a zero voltage switching operation, wherein said first and second switches in said switching means include, respectively, first and second field effect transistors connected in series between said input stage and a around voltage source, and wherein said switch driving means includes:

first delay means for delaying said control signal from said control means for a first predetermined time period;

first comparison means for comparing the level of an output signal from said first delay means with that of a first reference voltage signal and providing its output signal only when said output signal from said first delay means is higher in level than said first reference voltage signal;

first buffering means for buffering said output signal from said first comparison means and applying the buffered signal to a gate of said first field effect transistor in said switching means;

electric isolation means for electrically isolating said first field effect transistor from an output signal from said first buffering means;

second delay means for delaying said control signal from said control means for a second predetermined time period;

second comparison means for comparing the level of an output signal from said second delay means with that of a second reference voltage signal and providing its output signal only when said output signal from said second delay means is lower in level than said second reference voltage signal; and second buffering means for buffering said output signal from said second comparison means and applying the buffered signal to a gate of said second field effect transistor in said switching means.

2. An asymmetrical duty cycle flyback converter as set forth in claim 1, wherein said primary winding of said main transformer has its one side connected to a node between said first and second field effect transistors and its other side connected in series to a first capacitor.

3. An asymmetrical duty cycle flyback converter as set forth in claim 2, wherein said rectifying/smoothing means includes:

a diode having its anode connected to one side of said secondary winding of said main transformer; and a second capacitor connected between the other side of said secondary winding of said main transformer and a cathode of said diode.

4. An asymmetrical duty cycle flyback converter as set forth in claim 1, wherein said first delay means includes:

a resistor having its one side connected to an output terminal of said control means;

a reverse diode connected in parallel to said resistor; and a capacitor having its one side connected to a node between the other side of said resistor and said reverse diode and its other side connected to said ground voltage source.

5. An asymmetrical duty cycle flyback converter as set forth in claim 1, wherein said first comparison means includes a comparator having its non-inverting input terminal (+) connected to an output terminal of said first delay means and its inverting input terminal (−) connected to a first reference voltage source for generating said first reference voltage, said first reference voltage source being connected between said inverting input terminal (−) of said comparator and said ground voltage source.

6. An asymmetrical duty cycle flyback converter as set forth in claim 1, wherein said first buffering means includes npn and pnp transistors connected in series between a supply voltage source and said ground voltage source, said npn and pnp transistors having their bases connected in common to an output terminal of said first comparison means.

7. An asymmetrical duty cycle flyback converter as set forth in claim 1, wherein said electric isolation means includes a transformer with primary and secondary windings, said primary winding of said transformer having its one side connected to an output terminal of said first buffering means through a resistor and a capacitor and its other side connected to said ground voltage source, said secondary winding of said transformer being connected between said gate and a source of said first field effect transistor in said switching means.

8. An asymmetrical duty cycle flyback converter as set forth in claim 1, wherein said second delay means includes:

a resistor having its one side connected to an output terminal of said control means;

a forward diode connected in parallel to said resistor; and a capacitor having its one side connected to a node between the other side of said resistor and said forward diode and its other side connected to said ground voltage source.

9. An asymmetrical duty cycle flyback converter as set forth in claim 1, wherein said second comparison means includes a comparator having its inverting input terminal (−) connected to an output terminal of said second delay means and its non-inverting input terminal (+) connected to a second reference voltage source for generating said second reference voltage, said second reference voltage source being connected between said non-inverting input terminal (+) of said comparator and said ground voltage source.

10. An asymmetrical duty cycle flyback converter as set forth in claim 1, wherein said second buffering means includes npn and pnp transistors connected in series between a supply voltage source and said ground voltage source, said npn and pnp transistors having their bases connected in common to an output terminal of said second comparison means and their emitters connected in common to said gate of said second field effect transistor in said switching means.

* * * * *